March 21, 1967  R. T. HOOD, JR., ET AL  3,310,801
ANALOG-DIGITAL CONVERTER FOR WATT-HOUR METERS
Original Filed Jan. 28, 1963
Fig. 5
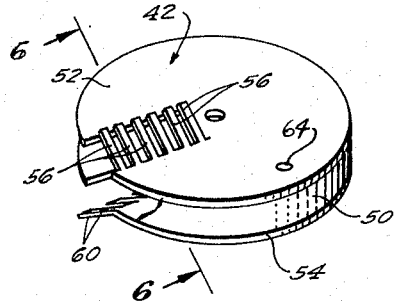
Fig. 6
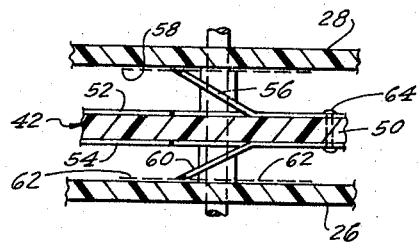
Fig. 7
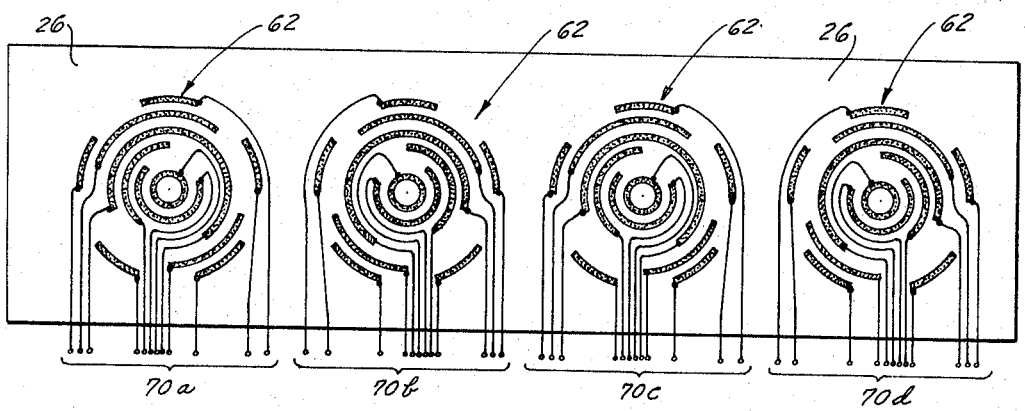
Fig. 8
GRAY CODE
```
0 = 0 - 1 - 1 - 1
1 = 1 - 1 - 1 - 1
2 = 1 - 1 - 1 - 0
3 = 1 - 1 - 0 - 0
4 = 1 - 0 - 0 - 0
5 = 1 - 0 - 0 - 1
6 = 1 - 0 - 1 - 1
7 = 1 - 0 - 1 - 0
8 = 0 - 0 - 1 - 0
9 = 0 - 0 - 1 - 1
```
INVENTORS:
David R. Stuettig
R. T. Hood, Jr.
By Keith D. Beecher
Attorney.

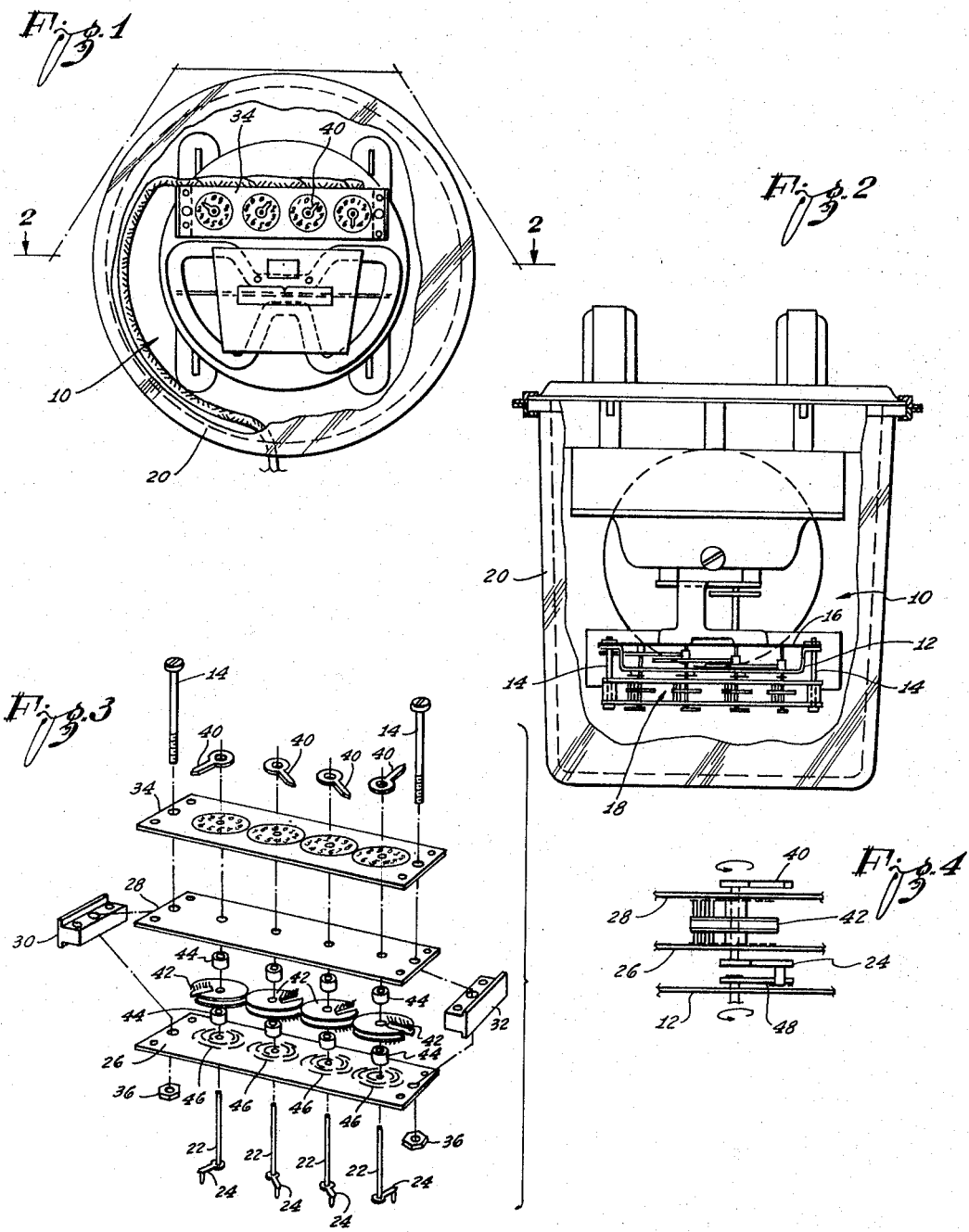

United States Patent Office 3,310,801
Patented Mar. 21, 1967

3,310,801
ANALOG-DIGITAL CONVERTER FOR
WATT-HOUR METERS
R. T. Hood, Jr., Torrance, and David R. Stuettig, Manhattan Beach, Calif., assignors, by mesne assignments, to Hersey-Sparling Meter Company, Dedham, Mass.
Continuation of application Ser. No. 254,126, Jan. 28, 1963. This application May 15, 1964, Ser. No. 369,354
12 Claims. (Cl. 340—347)

This application is a continuation of application Ser. No. 254,126, filed Jan. 28, 1963 now abandoned.

The invention relates generally to converter mechanisms of the analog-digital type, and it relates more particularly to an improved analog-digital converter unit which is especially constructed to be mounted on a utility meter, such as a usual domestic watt-hour meter, so as to convert the dial indicator readings of the meter into corresponding binary-coded digital information.

The usual domestic watt-hour meter, for example, includes a plurality of dial indicators which indicate on a cumulative basis the consumption of electrical energy by the customer. The different dial indicators of the meter are used to indicate the consumption of electrical energy for example, on a decimal scale, and on the basis of units, tens, hundreds, and thousands of kilowatt hours.

As is well known, other types of utility meters, such as gas, or water meters, also use separate dial indicators to indicate the consumption of the particular commodity or energy represented by the meter. The indication of these latter dial indicators is also made on a decimal scale, and with the various dials indicating respectively the units, tens, hundreds, and thousands digits of the reading.

An object of the present invention is to provide an improved analog-digital converter unit which may be conveniently coupled to the individual dials of a utility meter, or the like, and which functions to convert the different dial readings of the meter into equivalent binary-coded digital signals.

The invention will be illustrated and described herein as applied to an electrical power consumption watt-hour utility meter. It will be evident as the description proceeds, however, that the unit of the invention can be constructed to be suitable for coupling to other types of meters and measurement devices.

In general, the unit of the present invention is intended to be adapted to a wide variety of applications, and to serve generally to provide a convenient means for converting meter readings into corresponding binary-coded signals.

Copending application Ser. No. 252,726, filed Jan. 21, 1963, described the system for acquiring data. In the copending case, a recording system is described which is capable of being carried from station to station by, for example, a utility company inspector. The inspector plugs in the recorder at each station; and it thereby records digital information corresponding to the meter reading at that particular station, and it also records information identifying the particular station.

For example, as described in the copending application, the recording mechanism may be used by the company inspector to acquire the readings from the different domestic watt-hour meters in a particular community. When the watt-hour meters in the community are equipped with units constructed in accordance with the concepts of the present invention, binary-coded information is available at the various meters corresponding to the meter readings. It is then possible for the inspector to plug his recorder into convenient receptacles at the various meter stations, and thereby to obtain a recording in binary-coded form of the different meter readings.

In the embodiment of the invention to be described, a separate analog-digital code pattern is provided for each dial indicator of the utility meter on which the unit of the invention is to be mounted. Separate electrical contact brushes are also provided which selectively engage the different code patterns, and which are individually rotated as the corresponding dial pointers of the utility meter rotate to indicate the consumption of energy flowing through the meter.

The brushes and code patterns of the unit of the invention are electrically connected to an appropriate electrical receptacle, so that a binary-coded reading of the different dial indicator positions of the meter may be obtained merely by plugging the above-mentioned recorder, or other suitable instrumentality, into the receptacle.

The code patterns of the unit to be described utilize a Gray code rather than a straight binary code. This is to minimize reading ambiguities of the brushes. In the straight binary code, as the count progresses from one decimal digit to the next, it often happens that more than one binary bit changes from "1" to "0" and vice versa.

Therefore, with the straight binary code, and even with the most exacting tolerances, it is possible for the bit cross-over points in the different channels of the code patterns to yield errors. By use of the Gray code, as is well known, these ambiguity errors are reduced to plus or minus one decimal digit because the Gray code always changes by only one binary bit at any particular point as the count progresses from one decimal digit to the next.

It is also possible in the particular application of the analog-digital converter of the invention for ambiguities to exist between the different dial indicators of the utility meter with which the particular unit is associated.

For example, in typical watt-hour meter, as the thousands dial pointer approaches a whole number, the hundreds dial pointer approaches zero. It is therefore possible for the thousands dial pointer to reach its next whole number, insofar as its equivalent binary-coded signals generated by the unit are concerned, before the hundreds dial actually registers zero, insofar as its equivalent binary-coded signals are concerned. This creates the possibility of an error of 900 kilowatt hours, for example, in the recorded reading.

The embodiment of the converter unit to be described is constructed to include a separate interpolation channel in each of the code patterns, and these channels are each sensed by an associated brush. The resulting interpolation signals derived from the converter unit provide between successive dial numbers.

Another object of the invention is to provide such an improved analog-digital converter unit which is immune to tampering; and which cannot be adjusted to provide spurious readings unrelated to the actual meter readings without destroying the reading ability of the unit completely so that an examination of the unit obviously indicates that tampering has occurred.

Other objects and advantages of the invention will become apparent from a consideration of the following description when taken in conjunction with the accompanying drawings, in which:

FIGURE 1 is a front elevational view of a typical domestic watt-hour meter, on which an analog-digital converter constructed in accordance with one embodiment of the invention is mounted;

FIGURE 2 is a top view of the meter of FIGURE 1, and illustrates more clearly the manner in which the converter of the invention is mechanically coupled to the mechanism of the meter;

FIGURE 3 is an exploded view of the analog-to-digital converter assembly of one embodiment of the invention, and illustrates the various components which make up the assembly;

FIGURE 4 is a fragmentary view of a portion of the assembly of FIGURE 3 in assembled form;

FIGURE 5 is a perspective view of a rotating wiper assembly, a plurality of which are used in the converter of FIGURE 3;

FIGURE 6 is a fragmentary sectional view of the assembly of FIGURE 5, taken substantially on the line 6—6 of FIGURE 5, and also showing the manner in which the wiper assembly of FIGURE 5 engages conductive patterns disposed above and below the wiper assembly;

FIGURE 7 is an enlarged view of printed circuit analog-digital encoder patterns inscribed on a supporting insulating plate or panel, a pair of which are used in the assembly of FIGURE 3; and FIGURE 8 is a representation of the Gray type binary code, which is utilized in the encoder patterns of FIGURE 7.

As mentioned above, the improved analog-digital converter of the present invention is intended to be utilized in conjunction with domestic meters, such as the watt-hour meter 10 of FIGURES 1 and 2.

The watt-hour meter 10 includes, as mentioned above, a plurality of separate dial indicators which indicate the consumption of power on a decimal scale. In the meter under consideration, for example, four such dials are included, and these represent the power consumption on the basis of units, tens, hundreds and thousands of decimal digits.

As best shown in FIGURE 2, the different dial indicators of the meter 10 are mounted on a bracket 12. The improved analog-digital converter of the present invention is adapted to be conveniently mounted in the meter 10, by means, for example, of a pair of screws 14 which are adapted to extend into a support 16 for the bracket 12, and which serve to mount the converter assembly, indicated generally as 18 over the original bracket 12 in the meter.

A feature of the present invention, therefore, is that the analog-to-digital converter may be simply and easily mounted in the watt-hour meter 10, merely by removing the glass envelope 20, and by mounting the unit of the invention over the dial indicators of the meter by means, for example, of the screws 14. It will be appreciated that no internal modifications, changes or adjustments of the meter itself are required.

It should also be reiterated that, although the improved analog-to-digital converter of the invention is described herein as being mounted on a typical domestic watt-hour consumption meter, the converter may be mounted on any other type of meter which, for example, utilizes one or more dial indicators to indicate the amount of consumption of any particular commodity.

The improved analog-digital converter of the illustrated embodiment of the invention includes a plurality of shafts 22 (FIGURE 3). These shafts may be die cast, and they extend through the converter assembly to impart rotational movement to the different components thereof, as will be described. A corresponding plurality of cam followers 24 are mounted on the lower ends of respective ones of the shafts 22. These cam followers 24 are in the form of individual cranks, and they may be press-fit onto the corresponding shafts 22.

The different cam followers 24 engage the pointers of the dial indicators of the meter 10, when the converter assembly of the invention is mounted on the meter, as shown in FIGURE 2. Therefore, as the different pointers of the dial indicators rotate, they drive with them the corresponding cam followers 24 so that equivalent respective rotations are imparted to the different shafts 22.

The analog-to-digital converter assembly illustrated in FIGURE 3 includes a lower plate, or panel 26 of a rectangular configuration, and it includes a similar upper plate or panel 28. The plates 26 and 28 are formed of insulating material. The plates are held in spaced parallel relationship by means of a pair of spacers 30 and 32 which may be composed, for example, of aluminum.

A further plate 34 having the same dimensions as the plates 26 and 28 is adapted to fit over the top of the plate 28. The plate 34 may be in the form of a laminated plastic sheet which is cemented over the top of the upper plate 28. The plate 34 has a plurality of dial faces inscribed on its upper surface, these dial faces corresponding to the original dial faces of the original dial indicators of the meter 10.

The screws 14 extend through mounting holes in the plates 34, 28 and 26 and down into the mount 16, the screws being held in place by corresponding nuts 36, so that the converter assembly of FIGURE 3 is held in an assembled condition. When the assembly is in such an assembled condition, the plates 26 and 28 are held spaced from one another by the spacers 30 and 32.

The shafts 22 extend through respective apertures in the plates 26 and 28 and 34. Corresponding pointers 40 formed, for example, of aluminum are press-fit on the upper ends of the respective shafts 22. These pointers 40 cooperate with the dial calibrations on the upper surface of the plate 34 to provide visual indications, as shown in FIGURE 1, corresponding to the indications by the original dial indicators of the meter. These new visual indications are desired because the original dial indicators of the meter are hidden by the assembly of the invention.

Also mounted on the respective shafts 22 are a corresponding plurality of wiper assemblies 42. The constructional details of the individual wiper assemblies are shown in more detail in FIGURE 5. The wiper assemblies 42 are rotated as the corresponding shafts 22 are roated. The wiper assemblies are supported between the plates 26 and 28 by corresponding spacers 44.

As best shown in FIGURE 7, a plurality of code patterns 46 are formed on the upper face of the plate 26. These code patterns, as shown in FIGURE 7, are composed of conductive and non-conductive segments, and they are formed on the plate 26 by any known appropriate printed circuit process.

Corresponding encoder patterns are formed on the lower surface of the plate 28, these latter encoder patterns being the mirror images of the corresponding patterns 46 on the plate 26. The encoder patterns on the two plates are inter-connected in a parallel relationship so as to increase the reliability of the unit by providing a redundancy type arrangement.

The plates 26 and 28, and the encoder patterns thereon are used for increasing the reliability of the converter, in that each of the wiper assemblies 42 includes brushes which contact both encoder patterns on the plates 26 and 28, so that a contact malfunction with either one of the patterns will not affect the operation of the assembly.

The fragmentary representation of FIGURE 4 illustrates the manner in which an original pointer 48 in the meter 10 engages a corresponding one of the cam followers 24 to impart rotation to the associated drive shaft 22 corresponding to rotations of the pointer 48. The drive shaft 22 causes the corresponding wiper assembly 42 to cause its brushes to establish different contact relationships with the conductive patterns on the upper surface of the plate 26 and on the lower surface of the plate 28. At the same time, the corresponding pointer 40 rotates around its scale on the top surface of the plate 34 to provide an indication corresponding to the original indication by the pointer 48.

As mentioned above, details of one of the rotating wiper assemblies 42 is shown in FIGURE 5. The wiper assembly may include, for example, an insulating disc 50 composed, for example, of a suitable epoxy resin. A sheet of beryllium copper, or other appropriate electrically conductive material, is bonded to the top of the assembly, and the top sheet is designated 52.

A similar sheet of beryllium copper or other suitable conductive material, designated 54, is bonded to the bottom of the disc 50. The sheet 52 has a plurality of teeth 56 formed in it, and these teeth are bent upwardly so as to engage the different segments of the corresponding encoder pattern 58 (FIGURE 6) on the lower surface of the plate 28.

Likewise, the conductive sheet 54 has a plurality of teeth 60 formed in it, and these teeth are bent downwardly to engage the corresponding encoder pattern 62 (FIGURE 6) on the top surface of the plate 26.

The assembly of FIGURE 5 may be rhodium plated to inhibit oxidation and similar deterioration of the contact teeth 56 and 60. It will be appreciated that as each wiper assembly 42 is rotated by its corresponding shaft 22, the teeth 56 engage different segments of the corresponding encoder pattern 58, and the teeth 60 engage corresponding segments of the corresponding encoder pattern 62.

A conductive rivet 64, or the like, is inserted through the insulating disc 50, so as to establish electrical contact between the conductive sheet 52 and the conductive sheet 54 which are bonded to the opposite surfaces of the disc 50.

The printed circuit encoder patterns 62 on the top surface of the lower plate 26 are shown in detail in FIGURE 7. As mentioned above, similar encoder patterns, constituting mirror images of the respective patterns of FIGURE 7, are formed on the lower surface of the upper plate 28.

The various conductive segments of each encoder pattern in FIGURE 7 is connected to corresponding terminals, designated collectively as 70a, 70b, 70c, and 70d. These connections may be made by appropriate printed circuit conductors on the plate 26. The digital signals corresponding to the various angular positions of the shaft 22 appear across the output terminals. These output terminals are connected to an appropriate receptacle, such as described in copending application Ser. No. 254,620, filed Jan. 29, 1963. The receptacle is adapted to receive a plug of a recording mechanism, so that the digital signals appearing at the different output terminals may be recorded in the recording mechanism.

The encoder patterns of FIGURE 7 are each formed in accordance with the Gray code, such as shown in FIGURE 8. In each of the encoder patterns, the central annular conductive ring is the common connection, and the brushes 56 of the wiper assembly 42 connect the central ring to selective ones of the outer conductive rings, in accordance with the Gray code of FIGURE 8, as the corresponding shaft 22 is rotated.

In each of the shaft encoder patterns, the outer ring includes five distinct segments, and these constitute the interpolation channel of each pattern.

As is well known, mechanical analog-digital converters have inherent ambiguity which become even more critical when the requirement for registry between decades exists.

Unless some means of compensation is provided, absolute mechanical registry to 1 part in 10,000, and resolution of the same order is required in the most significant decade of the analog to digital converter. Since the converter is a high production, low cost device and is to be attached to a non-precision meter, such absolute mechanical registry is not feasible. Therefore, in the mechanism and system of the invention, electrical code logic compensation must be employed to overcome the effects of imperfect mechanical registry or ambiguity.

Gross errors within the decades are eliminated by adopting the Gray binary code. This code, as mentioned above, changes by one bit only between equivalent whole decimal numbers. The straight binary code, on the other hand, can change by up to four bits per whole decimal increment.

Slight misalignments of the brushes of the wiper assembly 42 can cause errors of more than one decimal digit when the straight binary code is used. By contrast, when the Gray binary code is used, brush misalignment can normally cause no more than one decimal digit error.

The use of the Gray code reduces ambiguity to one digit in the transition from a digit to the next highest in each decade. This accuracy is not sufficient since in the most significant decade, for example, a one digit ambiguity can yield an error of one thousand units.

It is fundamental that encoding errors occur in the analog-digital mechanism described above, only near the transition from one digit to the next highest digit in any decade. For example, a transition from any particular digit to the next highest in any decade, except the least significant (units) decade, is accompanied by a transition from 9 to 0 in the next lower decade. If imperfect angular alignment exists between decades in the mechanism, it is possible for the next highest digit in a particular decade to be reached before the previous decade has changed from 9 to 0. This results in one digit error in the particular decade.

The problem outlined immediately above is resolved by the logic of the human mind when visual readings are taken from the meter scales, such as the scales 40 in FIGURE 1. When visually reading the meter, the decision in transitional cases is made on the basis of the previous decade number, and the relative position of the pointer in the particular decade.

For example, if the pointer in the particular decade appears to be indicating exactly "5" and the pointer of the previous decade indicates "9," the reading would not be interpreted as "59," but would be interpreted exactly as "49." This is because a "9" would not be associated with a "5" if the pointer is nearer "5" than "6." A "low" 5 pointer position colud then never be associated with a "9."

The positionings of the interpolation segments referred to above are based on the concept of dividing each digit into a "high" and a "low" range. This provides an indication of the digit proximity range, and this indication provides a means for making a decision as to whether the reading of the most significant of any two decades should be increased by one digit or decreased by one digit within that decade.

In FIGURE 7, the interpolation conductive segments are positioned, for example, to center on alternate digits in each decade and to extend halfway between such alternate digits and the adjacent digits.

The object of the illustrated arrangement of interpolation segment in FIGURE 7 is to correlate the encoded decimal digit and interpolation bit of any particular decade to the preceding decade value. If other than the correct correlation is obtained, the decade being decisioned is reduced or increased by one digit. This procedure is carried out for each successive dial indicator until all the dials have been correlated.

A system for reading the output signals from the mechanism of the invention, after recordation by the recorder described in the afore-mentioned copending application Ser. No. 252,726, is described in the afore-mentioned copending application Ser. No. 317,548, filed Oct. 21, 1963.

The invention provides, therefore, an improved analog-to-digital converter which is adapted to be mechanically coupled to a utility meter, or the like. As mentioned above, the converter of the invention is advantageous in that it may be easily coupled to existing utility meters without the need to modify or change the internal mechanism of the meter itself.

The converter of the invention is especially advantageous in that it incorporates the above-described means for eliminating ambiguity errors, so that the converter of the invention is capable of providing accurate and precise digital indications of the corresponding meter readings.

While a particular embodiment of the invention has been shown and described, modifications may be made, and it is intended in the claims to cover such modifications which fall within the spirit and scope of the invention.

What is claimed is:

1. An analog-digital converter unit for attachment to a multi-stage register for encoding the digits successively represented by the individual stages of such register into binary coded signals, said register having a plurality of indicating elements corresponding to the respective stages of said register, said converter unit including: a support panel adapted to be mounted on said register over said indicating elements, a plurality of code patterns disposed on said panel and positioned to be in axial registry with respective ones of said indicating elements when said support panel is mounted on said register, each of said code patterns including electrically conductive segments positioned in a plurality of concentric annular tracks, a corresponding plurality of shafts rotatably mounted on said support panel and extending through corresponding ones of said code patterns into coupled relationship with respective ones of said indicating elements when said support panel is mounted on said register, a corresponding plurality of electrical contact brush members mounted on respective ones of said shafts to be rotated thereby, each of said electrical contact brush members including resilient brush elements positioned to engage selectively the conductive segments in said annular tracks of respective ones of said code patterns as said shafts rotate and to derive signals representative of successive digits from each of said code patterns, said successive digits corresponding to successive angular ranges of each of the respective shafts, and at least some of said code patterns each including further conductive segments arranged in a further annular concentric track and indicative of whether the corresponding shaft is in a high portion or low portion of each such angular range.

2. An analog-digital converter unit for attachment to the decade register of a utility meter, or the like, for encoding the decimal digits successively represented by the individual stages of said register into binary coded signals, said meter having a plurality of indicating elements, said converter units including: a support panel adapted to be mounted in said meter over said indicating elements, a plurality of code patterns disposed on said panel and positioned to be in axial registry with respective ones of said indicating elements when said support panel is mounted in said meter, each of said code patterns including electrically conductive segments positioned in a plurality of concentric annular tracks, a corresponding plurality of shafts rotatably mounted on said support panel and extending therethrough through the center of corresponding ones of said code pattern into coupled relationship with respective ones of said indicating elements when said support panel is mounted in said meter, a corresponding plurality of electrical brush contact members mounted on respective ones of said shafts to be rotated thereby, each of said electrical brush contact members including resilient brush elements positioned to engage selectively the conductive segments in said annular tracks of respective ones of said code patterns as said shafts rotate and to derive signals representative of said successive decimal digits from each of said code patterns, said successive decimal digits corresponding to successive angular ranges of each of the respective shafts, and at least some of said code patterns each including further electrically conductive segments arranged in a further annular concentric track and indicative of whether the corresponding shaft is in the high portion or low portion of each such angular range, and electric cable means adapted to extend through the housing of said utility meter and including individual conductors connected to the conductive segments of said code patterns.

3. An analog-digital converter unit for attachment to the decade register of a utility meter, or the like, for encoding the decimal digits successively represented by the individual stages of said register into binary coded signals, said meter having a plurality of indicating elements disposed in essentially coplanar relationship, said converter unit including: a support panel adapted to be mounted in said meter over said indicating elements, a plurality of code patterns disposed in side-by-side relationship on said support panel and positioned to be in axial registry with respective ones of said indicating elements when said support panel is mounted in said meter, each of said code patterns including electrically conductive segments positioned in a plurality of concentric annular tracks representative of Gray code binary digits, a corresponding plurality of shafts rotatably mounted on said support panel and extending therethrough and through the center of corresponding ones of said code patterns along parallel axes essentially perpendicular to the plane of said support panel into coupled relationship with respective ones of said indicating elements when said support panel is mounted in said meter, a corresponding plurality of electrically conductive brush contact members mounted on respective ones of said shafts to be rotated thereby, each of said contact members including resilient brush elements in common electrical contact with one another and positioned to engage selectively the conductive segments in said annular tracks of respective ones of said code patterns as said shafts rotate and to derive signals representative of successive decimal digits from each of said code patterns, said successive decimal digits corresponding to successive angular ranges of each of the respective shafts, and at least some of said code patterns each including further conductive segments arranged in a further annular concentric track and indicative of whether the corresponding shaft is in the high portion or low portion of each such angular range, and electric cable means adapted to extend through the housing of said utility meter and including individual conductors connected to the conductive segments of said code patterns.

4. The converter unit defined in claim 1 and which includes a plurality of indicators mounted on respective ones of said shafts to be rotated by said shafts.

5. The converter unit defined in claim 1 and which includes printed circuits formed on said support panel and interconnecting said conductors of said cable and said conductive segments.

6. The converter unit defined in claim 1 in which said indicating elements of said utility meter include pointers, and which includes crank-shaped cam follower members mounted on respective ones of said shafts to engage corresponding ones of said pointers.

7. An analog-digital converter unit for attachment to a multi-stage register for encoding the digits successively represented by the individual stages of such register into binary coded signals, said register having a plurality of rotatable elements corresponding to the respective stages of said register, said converter unit including: a support panel adapted to be mounted on said register over said rotatable elements, a plurality of code patterns disposed on said panel and positioned to be in axial registry with respective ones of said rotatable elements when said support panel is mounted on said register, each of said code patterns including electrically conductive segments positioned in a plurality of concentric annular tracks, a corresponding plurality of shafts rotatably mounted in said unit and extending through corresponding ones of said code patterns into coupled relationship with respective ones of said rotatable elements when said support panel is mounted on said register, a corresponding plurality of electrical contact brush members mounted on respective ones of said shafts to be rotated thereby, each of said electrical contact brush members including resilient brush elements positioned to engage selectively the conductive segments in said annular tracks of respective ones of said code patterns as said shafts rotate and to derive signals representative of successive digits from each of said code patterns, said successive digits corresponding to successive angular ranges of each of the respective shafts, and at least some of said code patterns each including further conductive segments arranged in a further annular concentric track and indicative of whether the corresponding shaft is in the high portion or low portion of each such angular range.

8. An analog-digital converter unit for attachment to the decade register of a utility meter, or the like, for encoding the decimal digits successively represented by the individual stages of said register into binary coded signals, said meter having a plurality of rotatable elements, said converter units including: a support panel adapted to be mounted in said meter over said rotatable elements, a plurality of code patterns disposed on said panel and positioned to be in axial registry with respective ones of said rotatable elements when said support panel is mounted in said meter, each of said code patterns including electrically conductive segments positioned in a plurality of concentric annular tracks, a corresponding plurality of shafts rotatably mounted with respect to said support panel and extending therethrough through the center of corresponding ones of said code pattern into coupled relationship with respective ones of said rotatable elements when said support panel is mounted in said meter, a corresponding plurality of electrical brush contact members mounted on respective ones of said shafts to be rotated thereby, each of said electrical brush contact members including resilient brush elements positioned to engage selectively the conductive segments in said annular tracks of respective ones of said code patterns as said shafts rotate and to derive signals representative of successive decimal digits from each of said code patterns, said successive decimal digits corresponding to successive angular ranges of each of the respective shafts, and at least some of said code patterns each including further electrically conductive segments arranged in a further annular concentric track and indicative of whether the corresponding shaft is in the high portion or low portion of each such angular range, and electric cable means adapted to extend through the housing of said utility meter and including individual conductors connected to the conductive segments of said code patterns.

9. An analog-digital converter unit for attachment to the decade register of a utility meter, or the like, for encoding the decimal digits successively represented by the individual stages of said register into binary coded signals, said meter having a plurality of rotatable elements disposed in essentially coplanar relationship, said converter unit including: a support panel adapted to be mounted in said meter over said rotatable elements, a plurality of code patterns disposed in side-by-side relationship on said panel and positioned to be in axial registry with respective ones of said rotatable elements when said support panel is mounted in said meter, each of said code patterns including electrically conductive segments positioned in a plurality of concentric annular tracks representative of Gray code binary digits, a corresponding plurality of shafts rotatably mounted with respect to said support panel and extending therethrough and through the center of corresponding ones of said code patterns along parallel axes essentially perpendicular to the plane of said support panel into coupled relationship with respective ones of said rotatable elements when said support panel is mounted in said meter, a corresponding plurality of electrically conductive brush contact members mounted on respective ones of said shafts to be rotated thereby, each of said contact members including resilient brush elements in common electrical contact with one another and positioned to engage selectively the conductive segments in said annular tracks of respective ones of said code patterns as said shafts rotate and to derive signals representative of successive decimal digits from each of said code patterns, said successive decimal digits corresponding to successive angular ranges of each of the respective shafts, and at least some of said code patterns each including further conductive segments arranged in a further annular concentric track and indicative of whether the corresponding shaft is in the high portion or low portion of each such angular range, and electric cable means adapted to extend through the housing of said utility meter and including individual conductors connected to the conductive segments of said code patterns.

10. The converter unit defined in claim 9 in which said rotatable elements of said utility meter include pointers, and which includes crank-shaped cam follower members mounted on respective ones of said shafts to engage corresponding ones of said pointers.

11. In an analog-digital converter for a multi-stage register for encoding the digits successively represented by the individual stages of such a register into binary coded signals, and said register having a plurality of rotatable elements corresponding to the respective stages of said register, the combination of: support means mounted on said register over said rotatable elements, a plurality of code patterns disposed on said support means and positioned to be in axial registry with respective ones of said rotatable elements, each of said code patterns including segments positioned in a plurality of concentric annular tracks, a corresponding plurality of members rotatably mounted with respect to said support means for respectively detecting said segments of each of said code patterns as said rotatable elements rotate and to derive signals representative of successive digits from each of said code patterns, said successive digits corresponding to successive angular ranges of each of the respective rotatable elements; and at least one of said code patterns including further segments positioned in a further annular concentric track and indicative of whether the corresponding one of said rotatable elements is in the high portion or low portion of each such range; and a corresponding plurality of coupling members for coupling said detecting members to respective ones of said rotatable elements.

12. In an analog-digital converter for a multi-stage register for encoding the digits successively represented by the individual stages of such a register into binary coded signals and said register having a plurality of rotatable elements corresponding to the respective stages of said register, the combination of: support means mounted on said register over said rotatable elements, a plurality of code patterns disposed on said support means and positioned to be in axial registry with respective ones of said rotatable elements, each of said code patterns including electrically conductive segments positioned in a plurality of concentric annular tracks, a corresponding plurality of electrical contact brush members rotatably mounted with respect to said support means, each including resilient brush elements positioned to engage selectively the electrically conductive segments in said annular tracks of respective ones of said code patterns as said rotatable elements rotate and to derive signals representative of successive digits from each of said code patterns, said successive digits corresponding to successive angular ranges of each of the respective rotatable elements, and at least one of said code patterns including further electrically conductive segments positioned in a further annular concentric track and indicative of whether the corresponding one of said rotatable elements in the high portion or low portion of each such angular range; and a corresponding plurality of coupling members for coupling said brush members to respective ones of said rotatable elements.

References Cited by the Examiner

UNITED STATES PATENTS

| | | | |
|---|---|---|---|
| 2,818,557 | 12/1957 | Sink et al. | 340—347 |
| 3,006,712 | 10/1961 | Eichacker | 346—14 |

MAYNARD R. WILBUR, *Primary Examiner.*

A. L. NEWMAN, *Assistant Examiner.*